United States Patent [19]
Vars et al.

[11] Patent Number: 5,873,351
[45] Date of Patent: Feb. 23, 1999

[54] GAS MASS FLOW CONTROL SYSTEM

[75] Inventors: Curtis C. Vars, Andover, N.Y.; Jason E. Yost, Windsor, Colo.

[73] Assignee: Woodward Governor Company, Loveland, Colo.

[21] Appl. No.: 840,323

[22] Filed: Apr. 16, 1997

[51] Int. Cl.$^6$ .................................................. F02M 21/04
[52] U.S. Cl. ........................................................ 123/527
[58] Field of Search ................................... 123/527, 430, 123/478

[56] References Cited

U.S. PATENT DOCUMENTS

| | | | |
|---|---|---|---|
| 2,068,804 | 1/1937 | Kedzie | 158/119 |
| 2,240,119 | 4/1941 | Montgomery et al. | 73/207 |
| 2,398,199 | 4/1946 | Townsend | 48/180 |
| 2,601,654 | 6/1952 | Wright | 137/152 |
| 2,905,543 | 9/1959 | Schreter et al. | 48/184 |
| 2,948,295 | 8/1960 | Smith, Jr. | 137/487.5 |
| 3,102,555 | 9/1963 | Botkin | 137/630.15 |
| 3,110,320 | 11/1963 | Rosenberger | 137/563 |
| 3,499,456 | 3/1970 | Rerecich et al. | 134/151 |
| 4,026,321 | 5/1977 | Kahoe et al. | 137/487 |
| 4,063,096 | 12/1977 | Roberts | 250/343 |
| 4,063,905 | 12/1977 | Johnson et al. | 48/180 |
| 4,413,646 | 11/1983 | Platt et al. | 137/240 |
| 4,430,978 | 2/1984 | Lewis | 123/478 |
| 4,483,303 | 11/1984 | Ishikawa et al. | 123/527 |
| 4,529,573 | 7/1985 | Varady | 422/111 |
| 4,763,681 | 8/1988 | Cuny et al. | 137/8 |
| 4,774,909 | 10/1988 | Dolderer | 123/1 A |
| 4,816,987 | 3/1989 | Brooks et al. | 364/165 |
| 4,838,295 | 6/1989 | Smith et al. | 137/9 |
| 4,991,561 | 2/1991 | Gerassimov et al. | 123/527 |
| 5,062,446 | 11/1991 | Anderson | 137/468 |
| 5,083,744 | 1/1992 | Reinicke et al. | 251/129.11 |
| 5,101,862 | 4/1992 | Leete | 137/899 |
| 5,127,418 | 7/1992 | Shimomura et al. | 137/486 |
| 5,146,941 | 9/1992 | Statler | 137/8 |
| 5,152,309 | 10/1992 | Twerdochlib et al. | 137/8 |
| 5,158,230 | 10/1992 | Curran | 236/49.4 |
| 5,269,280 | 12/1993 | Braun et al. | 123/527 |
| 5,311,849 | 5/1994 | Lambert et al. | 123/337 |
| 5,363,874 | 11/1994 | Henszey et al. | 137/14 |
| 5,388,607 | 2/1995 | Ramaker et al. | 137/88 |
| 5,431,182 | 7/1995 | Brown | 137/85 |
| 5,464,038 | 11/1995 | Kruto | 137/486 |
| 5,488,969 | 2/1996 | King et al. | 137/8 |
| 5,509,434 | 4/1996 | Boyd et al. | 137/8 |

OTHER PUBLICATIONS

Brochure—South Bend Controls Inc., Tech Data, "Compressed Gas Metering Valve," Bulletin PV–219, 1992.
Brochure—Mesa Environmental, "Gem Lean–Burn Control System Features," Jan. 13, 1995.
Drawing—Mesa Environmental, "Multi–Pwm Injector Metering Valve".

*Primary Examiner*—John T. Kwon
*Attorney, Agent, or Firm*—Leydig, Voit & Mayer,Ltd.

[57] ABSTRACT

A gas fuel admission system for use with a gas fuel supply and an internal combustion engine having an engine control unit that produces a desired mass flow signal. The system has a continuously variable gas fuel admission valve having a flow control element and nozzle for metering gas in sonic flow from the gas supply to the engine with insensitivity to the valve discharge pressure. An actuator moves the flow control element relative to the nozzle. The system also has a flow control circuit that responds to the desired mass flow signal from the engine control unit, a gas supply pressure signal from a gas supply pressure sensor, a gas supply temperature signal from a gas supply temperature sensor, and a flow control element position signal from a flow control element position sensor to determine the appropriate flow control element position needed to achieve the desired mass flow at the present engine operating conditions.

20 Claims, 7 Drawing Sheets

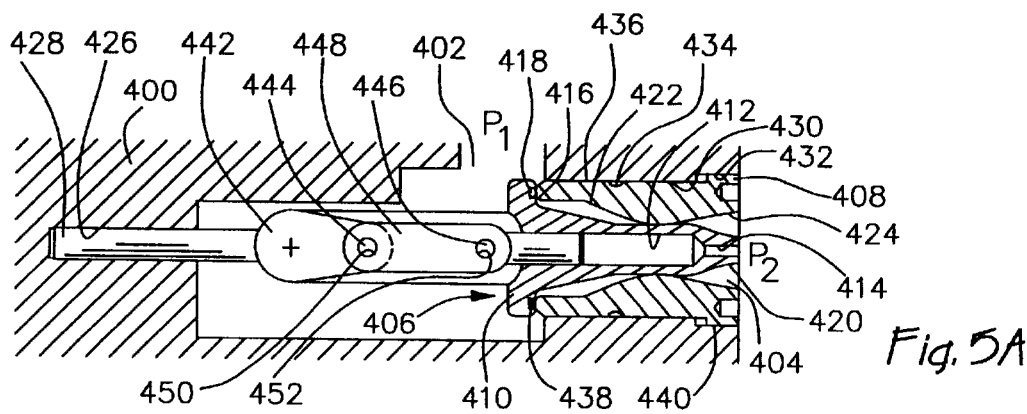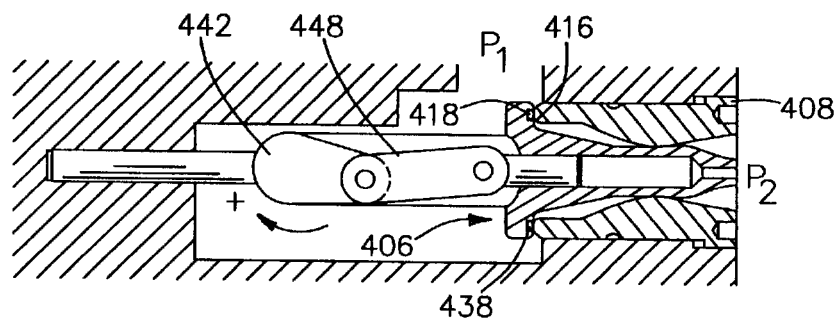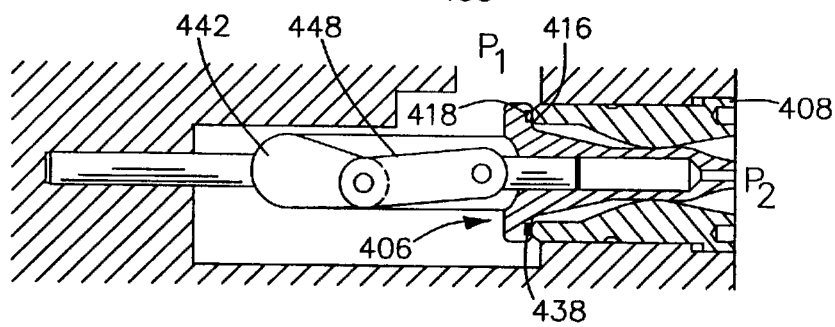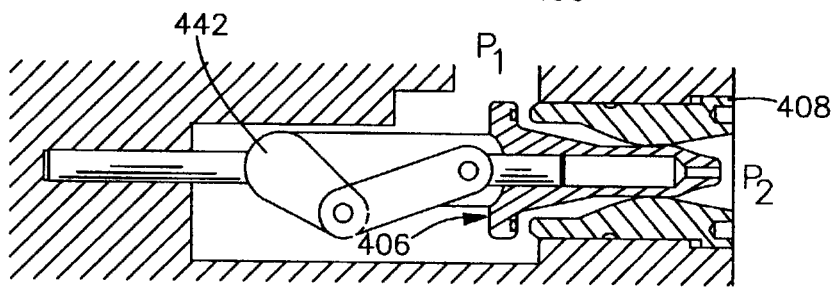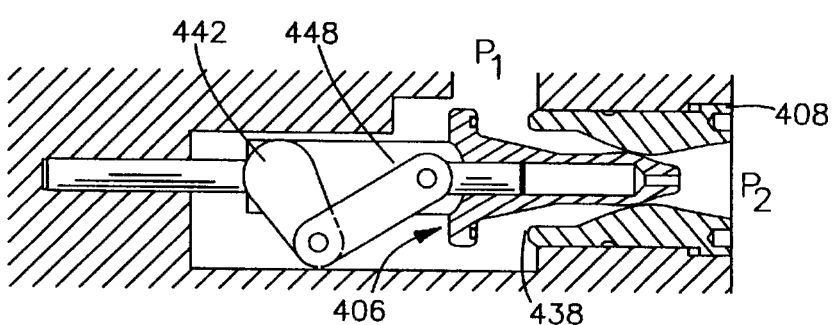

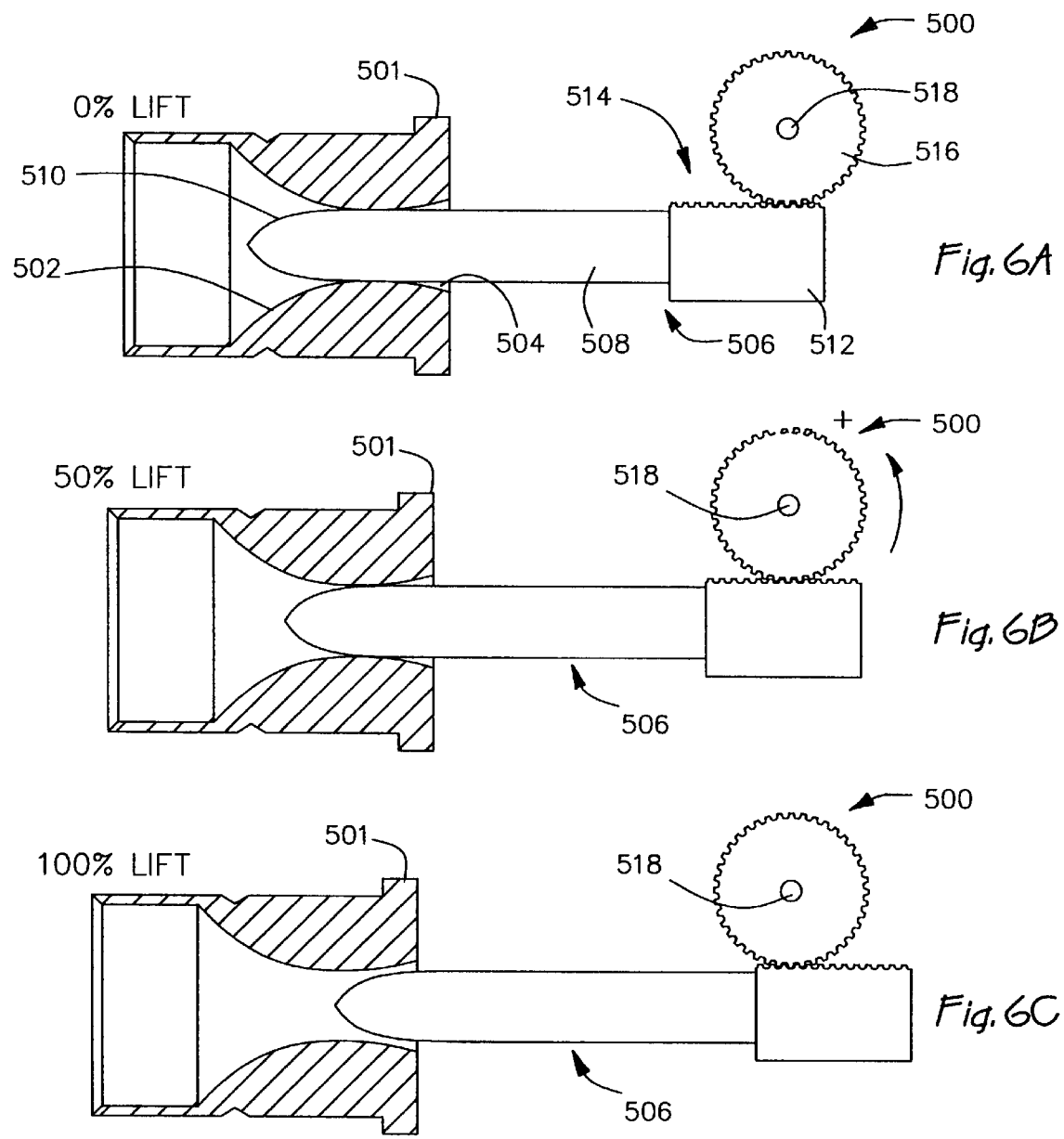

GAS MASS FLOW CONTROL SYSTEM

BACKGROUND OF THE INVENTION

The present invention relates generally to gas fuel admission systems for use with internal combustion engines. In particular, the invention relates to a gas fuel admission system with a gas admission valve which meters mass flow of gas to internal combustion engines.

Gas fuel systems are used for a variety of internal combustion engines, such as reciprocating or turbine engines used on vehicles and in industrial settings. These engines may utilize fuel systems that provide natural gas (predominantly methane) from liquid natural gas (LNG) or compressed natural gas (CNG) sources, or other gaseous fuels such as propane or hydrogen.

For a gas flowing through an orifice or valve at a temperature ($T_1$), there is a critical pressure ratio ($P_{CR}$) of the discharge pressure ($P_2$) to the supply pressure ($P_1$) for which flow through the orifice is unaffected by $P_2$ whenever $P_2 < (P_{CR} \times P_1)$. This is a well known compressible flow phenomena referred to as sonic or choked flow. The critical pressure ratio $P_{CR}$ is not the same for all gases, for instance it is 0.53 for air, 0.54 for natural gas, and 0.58 for propane. In essence, all gas fuel admission systems must utilize sonic flow, subsonic (non-choked) flow or a combination of both flow regimes. Because of the relatively high air supply pressures used with the intake systems of modern gas internal combustion engines, a vastly simplified system could be achieved if the fuel admission valve could always operate in the sonic regime.

As a good example within this field, gas fuel admission systems have been used for vehicular and industrial LNG and CNG engines. The fuel systems on these engines are moving from traditional natural gas carburetors to precise mass flow control fuel injection systems with electronic engine controllers. The move is for many of the same reasons that automobile gasoline engines moved to fuel injection systems, namely, to reduce emissions, improve fuel economy, improve driveability, improve cold starting and enhance performance.

Large engines used in on-highway (truck and bus) applications generally utilize turbocharging systems to enhance engine performance. The fuel injection systems feed the gas into the engine downstream of the turbocharger air pressurizing function. Therefore, with present lean-burn engines, fuel admission valve discharge pressures $P_2$ can range from ambient to in excess of 40 psia at full turbo boost. For LNG systems, gas fuel supply pressures $P_1$ can be as low as 55 psia. Assuming the fuel is natural gas, with a critical pressure ratio $P_{CR}=0.54$ and a supply pressure $P_1=55$ psia, a fuel system on a turbocharged engine using present fuel admission valve technology could only operate in the sonic flow regime up to a maximum turbocharged intake pressure of approximately 30 psia. The fuel supply system would operate in subsonic flow for turbocharger (and resultant fuel system discharge) pressures $P_2$ above 30 psia.

Presently, there are essentially three fundamental methods of accomplishing precise mass flow control of a gas. The first uses a proportional valve/actuator, mass flow feedback sensor, and microprocessor controller in a closed operational loop. With direct measurement by a mass flow sensor, the valve is driven up or down until the indicated mass flow equals the commanded mass flow. However, this method has disadvantages. Economical mass flow sensors have not yet achieved a reputation for excellent reliability and long term ability to hold calibration. In addition, overall transient response is limited by the mass flow feedback sensor lag as well as the lag in the closed loop processing to position the valve. Finally, the available automotive grade mass flow sensors are intended for use in measuring the mass flow of air. Consequently, when used for natural gas at much lower flow rates, they do not operate at their designed optimum conditions. Examples of systems using this approach can be seen in U.S. Pat. Nos. 4,838,295 to Smith et al. and No. 5,146,941 to Statler.

The second method uses a proportional valve/actuator, gas supply pressure ($P_1$) sensor, gas valve discharge pressure ($P_2$) sensor, gas supply temperature ($T_1$) sensor, precise valve position sensor, and microprocessor controller in a closed operational loop. Stored in memory is a map of effective valve area ($C_v$) versus valve position. The algorithms for subsonic and sonic flow are different. Therefore, the flow calculation routine in the controller must first determine whether subsonic or sonic flow exists, and then must select and apply the appropriate algorithms to drive the valve up or down until the calculated mass flow equals the commanded mass flow. Although this method uses sensors that are more simple and well-proven than the mass flow sensors of the first method, this method has the disadvantage of using many sensors. This presents increased reliability concerns, and because errors are cumulative, to achieve excellent mass flow control accuracy, all sensors must be exceptionally accurate and stable over the long term. Moreover, the use of multiple sensors and subsonic as well as sonic flow regimes requires intensive calculation processing power. Transient response of the system is thus limited by the sensor lag times and the more intensive calculations required. Examples of systems using this approach can be seen in U.S. Pat. No. 5,388,607 to Ramaker et al. and U.S. Pat. No. 5,488,969 to King et al.

The third method uses a proportional valve/actuator in which the valve always runs in the sonic flow regime using a gas supply pressure ($P_1$) sensor and a gas supply temperature ($T_1$) sensor for density correction. This method has some advantages for use with gases (compressible flow) in that a minimum number of sensors are required, the correction for $P_1$ and $T_1$ variations are relatively simple, the calculations for valve positioning are not as intensive, and if it is known that gas valve discharge pressure $P_2$ will always be less than $P_{CR} \times P_1$, then no $P_2$ sensor is required.

However, this third method does have some disadvantages. Given the critical pressure ratios $P_{CR}$ for gases, as an alternative to having to add a $P_2$ sensor and operate at subsonic levels with additional algorithms, for the fuel system to operate only in sonic flow it generally must have a higher supply pressure than other methods. In fact, the necessary supply pressure would likely exceed the tank pressure for LNG applications. Moreover, higher supply pressure also limits the driving range of vehicles having CNG sources.

Systems operating by the third method have used two different techniques. First, a multitude of pulse width modulated (PWM) solenoid valves may be employed. The solenoid valves must open and close rapidly to obtain variable sonic flow. The valves tend to have durability problems and packaging can be problematic because engines capable of generating as much as 300 horsepower may require as many as eight solenoid valves in one common housing.

In a second configuration that utilizes the third method, a series of choked flow valves, each one flowing at twice the fuel capacity of its predecessor, are arranged for activation of however many of the valves are necessary to achieve the desired flow. These valves are not PWM but the system requires a multitude of valves, invoking similar packaging problems and actuation complexities.

SUMMARY OF THE INVENTION

In view of the foregoing, it is a general object of the present invention to provide a gas fuel admission system and fuel admission valve for internal combustion engines which achieves continuously variable control of gas mass flow by utilizing the sonic (choked) flow principal throughout the entire operating range of an engine with insensitivity to gas admission valve discharge pressures $P_2$. It is a further related object to provide a gas admission system capable of operating without measuring mass flow and without measuring gas valve discharge pressure $P_2$.

It is a more particular object of the present invention to provide a continuously variably controlled valve having a contoured flow control element (such as a needle) and contoured orifice (such as a nozzle) that provide sonic flow at discharge pressure $P_2$ to supply pressure $P_1$ ratios ($P_2/P_1$) greater than 0.54. For instance, the present invention could be used with a gas fuel system as mentioned in the above example of a lean burn, turbocharged engine to operate in sonic flow throughout the entire engine operating range despite having a discharge pressure as high as 40 psia and a supply pressure as low as 55 psia, i.e., $P_2/P_1=40/55=0.73$.

A further related object is to provide a valve having a nozzle with a converging inlet and a diffusing outlet as well as a needle which does not violate the converging or diffusing characteristics of the nozzle. The needle, in combination with a nozzle having a converging inlet and diffusing (or diverging) outlet causes locally increased gas velocity at the region of minimum clearance between the needle and nozzle (also characterized by reduced density and reduced pressure), and the reduced pressure in that region becomes the effective $P_2$. Therefore, the effective pressure ratio can be sonic ($<P_{CR}$), when the actual downstream to upstream pressure ratio is substantially greater than the critical pressure ratio $P_{CR}$. Translating the needle within the nozzle varies the size of the minimum clearance, providing the ability to vary gas flow.

According to one aspect of the invention, it is an object to provide a valve with enhanced position control to achieve improved valve sealing force and flow accuracy at low flow conditions. A related object is to provide a valve capable of maintaining throughout the engine operating range a substantially constant limit of maximum percent flow error between the desired gas mass flow and the actual gas mass flow provided.

It is another object of the invention to provide a valve that achieves positive fuel shutoff.

It is a further object of the invention to provide a "smart" valve, capable of receiving a desired flow signal, determining any adjustment to the valve needle position needed at the present operating conditions, activating the valve to achieve the necessary needle position, and providing information to the engine control unit for control of other functions or to aid in diagnostics.

According to another aspect of the invention, it is an object to provide a condensate removal system to prevent the buildup of liquids within the valve during normal operation.

It is still another object of the present invention to provide a gas mass flow control valve that utilizes a non-cycling proportional valve and actuator. It is yet another object to provide a precise, highly responsive gas fuel admission system that is reliable, compact, lightweight and economical.

The present invention accomplishes these objectives and overcomes the disadvantages of the prior art by providing a fuel admission system for use with a gas fuel supply and an internal combustion engine having an engine control unit that produces a desired mass flow signal. The system has a continuously variable gas admission valve having a flow control element and nozzle for metering gas from the gas supply to the engine. The nozzle has a converging inlet and a diffusing outlet. An actuator moves the flow control element relative to the valve nozzle. The system also has a gas supply pressure sensor that produces a signal related to gas supply pressure and a gas supply temperature sensor that produces a signal related to gas supply temperature. A position sensor produces a signal related to the position of the flow control element. The system also has a flow control circuit that responds to the desired mass flow signal from the engine control unit, the supply pressure signal, the supply temperature signal, and the flow control element position signal to determine the appropriate flow control element position needed to achieve the desired mass flow at the present engine operating conditions.

The gas fuel admission system achieves the advantages over the prior art by utilizing a continuously variable gas metering valve according to the present invention having no mass flow sensor but being adapted to respond to a desired mass flow rate electrical input signal to produce an actual gas mass flow rate corresponding to the desired mass flow rate electrical input signal. The valve has a housing having an inlet port connected to a gas supply system and an outlet port being in communication with the engine. The housing has a flow passage between the inlet and outlet ports and a nozzle mounted in the flow passage. The nozzle has a converging inlet and a diffusing outlet. A flow control element is coaxial with the nozzle and mounted at least partially within the nozzle for controllable positioning to control the flow through the nozzle. An electrical actuator is connected to the flow control element for positioning the flow control element relative to the nozzle. The valve has a gas supply pressure sensor and gas supply temperature sensor in the housing having sensing elements in the passage between the housing inlet port and the nozzle inlet for producing electrical signals relating to gas pressure and gas temperature, respectively. A position sensor is connected to the flow control element for producing an electrical signal relating to the position of the flow control element. The valve has an electrical control circuit responsive to the desired mass flow rate electrical input signal, the signals relating to the gas supply pressure and temperature and the signal relating to the position of the flow control element. The circuit is connected to the actuator and is adapted to produce an output signal to control the actuator to adjust the position of the flow control element relative to the signals received by the circuit.

Further objects and advantages of the present invention will become apparent from the following detailed description when taken in conjunction with the drawings.

BRIEF DESCRIPTION OF THE DRAWINGS

In describing the preferred embodiments, reference is made to the accompanying drawings wherein like parts have like reference numerals, and wherein:

FIG. I is a block diagram representing a fuel admission system and fuel admission valve in accordance with the teachings of the invention.

FIG. 5A is a sectioned view of a another embodiment of the crank, link and flow control element construction in a housing and nozzle assembly with the actuator at 0 degrees rotation and the flow control element in the fully closed position.

FIG. 5B is a further view of the embodiment of FIG. 5A with the actuator at 7 degrees rotation and the flow control element seal element lifting off the face of the nozzle.

FIG. 5C is a further view of the embodiment of FIG. 5A with the actuator at 10 degrees rotation which is a minimum fuel flow position.

FIG. 5D is a further view of the embodiment of FIG. 5A with the actuator at 37.5 degrees rotation, which is 50% of angular travel.

FIG. 5E is a further view of the embodiment of FIG. 5A with the actuator at 65 degrees rotation, which is full angular travel and the full flow position.

FIG. 6A is a sectioned view of a third embodiment of a fuel admission valve constructed in accordance with the actuator utilizing a rack and pinion drive and with the flow control element approaching the nozzle from the outlet side of the nozzle.

FIG. 6B is a further view of the embodiment of FIG. 6A with the flow control element at 50% of travel.

FIG. 6C is a further view of the embodiment of FIG. 6A with the flow control element at 100% of travel.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DESCRIPTION OF THE PREFERRED EMBODIMENTS

Figure 1:
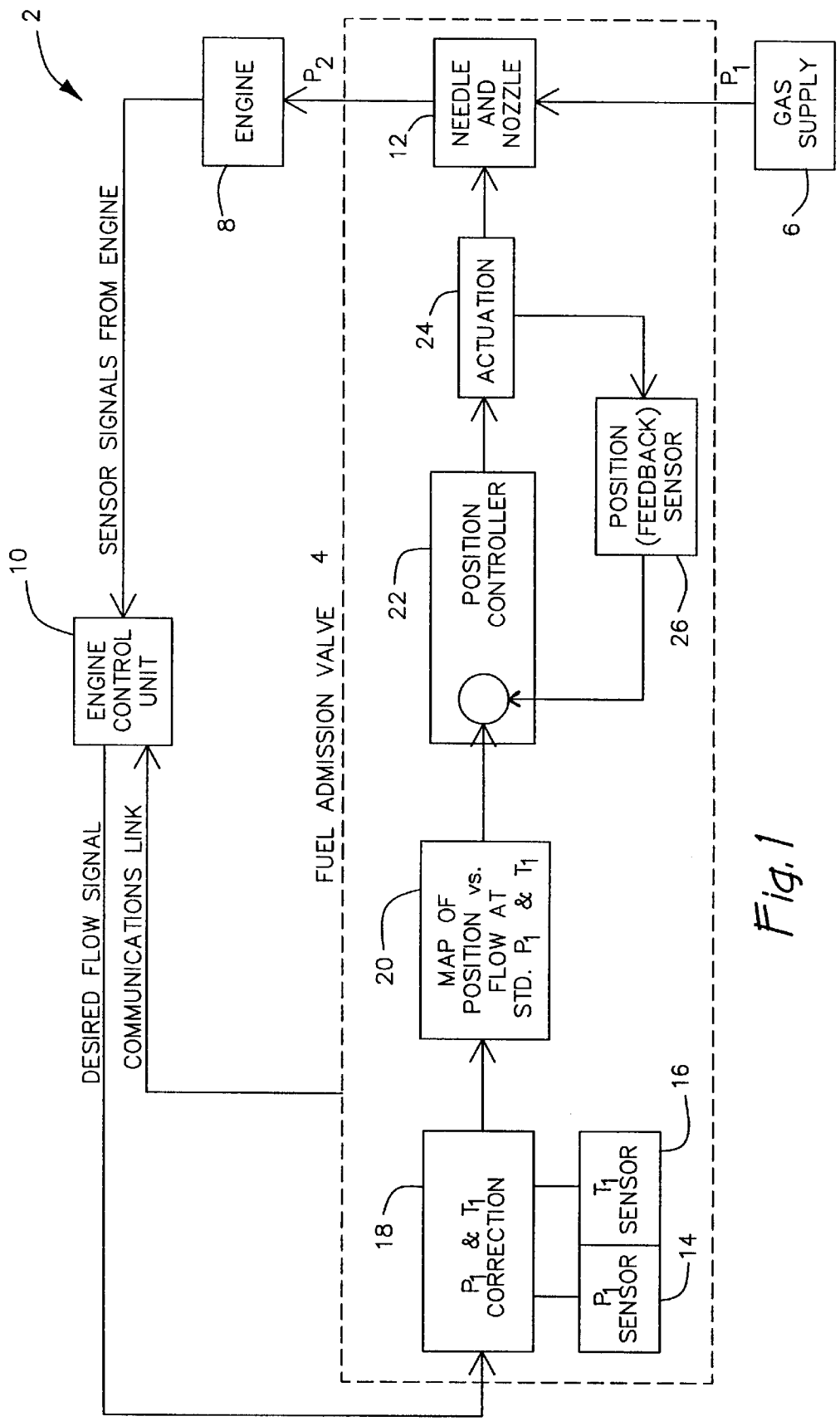

Turning now to the drawings, FIG. 1 schematically illustrates the relationship between certain key elements of an internal combustion engine gas fuel admission system 2 and the operation of a fuel admission valve 4. The objective of the fuel system 2 is to control the valve 4, coupled between a gas supply source 6 and an engine 8, to meter the mass flow of the fuel to achieve optimum performance under all operating conditions. In performing its metering task, the valve 4 receives a desired flow signal from an engine control unit 10. To determine the desired mass flow signal, the engine control unit 10 monitors operator input signals from devices such as a foot pedal, not shown, and receives sensor signals from the engine 8 as well as information from the valve 4.

In the preferred embodiment, the engine control unit 110 sends the valve 4 a pulse width modulated (PWM) desired fuel mass flow signal in order to achieve the desired power while maintaining the appropriate air to fuel ratio. One skilled in the art will appreciate that the signal and electronic circuitry could be designed to handle other types of signals, such as analog or serial communications. The valve 4 ultimately meters the gas with a flow control element (such as a needle) and nozzle 12. The valve 4 has a flow control circuit that determines the specific valve needle position required to provide the desired mass flow from the engine control unit 10.

The flow control circuit of valve 4 receives signals from a gas supply pressure sensor 14 and a gas supply temperature sensor 16 which utilize sensing elements to monitor the pressure ($P_1$) and the temperature ($T_1$) of the gas entering the valve 4 from the gas supply 6. The valve 4 is calibrated for the type of gas chosen for use with the particular engine 8. Although one skilled in the art will appreciate that other means such as analog circuitry could be employed, the flow control circuit of the preferred embodiment uses a potted printed circuit assembly with a 16 bit microprocessor that receives the signals from the sensors 14 and 16 and preprogrammed maps of well known density correction factors for the type of gas chosen or calculates correction factors based on gas flow equations well known in the art. The flow control circuit performs a density correction 18. This corrected flow signal is then applied to a map or look-up table 20 of needle position versus gas mass flow at standard $P_1$ and $T_1$ operating conditions to achieve a desired needle position signal. In the preferred embodiment, this signal is fed to a position controller 22, such as a proportional integral derivative control device, to enhance the response and precision of the operation of the actuation means 24 which positions the needle within the nozzle 12. The flow control circuit can also employ a current feedback sensor from the actuation means to the controller to enhance actuator response, stability and stiffness.

Many types of actuation means 24 could be used. For instance, in addition to the embodiments shown in FIGS. 2–5E which show a preferred electrical rotary actuator assembly of the Lundell style four pole limited angle torque motor with a crank and link mechanism, a valve 4 could use the limited angle rotary actuator with the rack and pinion mechanism shown in FIGS. 6A–6C, or any one of several available types of rotary actuators, as well as other available types of linear actuators, such as a linear solenoid, a linear voice coil, etc. To further enhance the performance and accuracy of the actuation means 24, within the flow control circuit, a position (feedback) sensor 26 monitors the actual position achieved by the actuation means 24 and delivers a signal to the position controller 22, thus forming a closed loop position control system to help adjust and stabilize the signal driving the actuation means 24.

The system does not need to measure the discharge pressure $P_2$ from valve 4 (between the needle and nozzle 12 and the engine 8) because the nozzle has a converging inlet and diffusing outlet that result in sonic (choked) flow at substantially higher $P_2/P_1$ pressure ratios than typical critical pressure ratios (i.e., $P_{CR}=0.54$ for methane). This results in mass flow insensitivity to a wide range of discharge pressures $P_2$. This overcomes drawbacks of the prior art and simplifies the hardware requirements and calculations required during operation. Accordingly, the above-described fuel system 2 is highly responsive and accurate.

Figure 2:
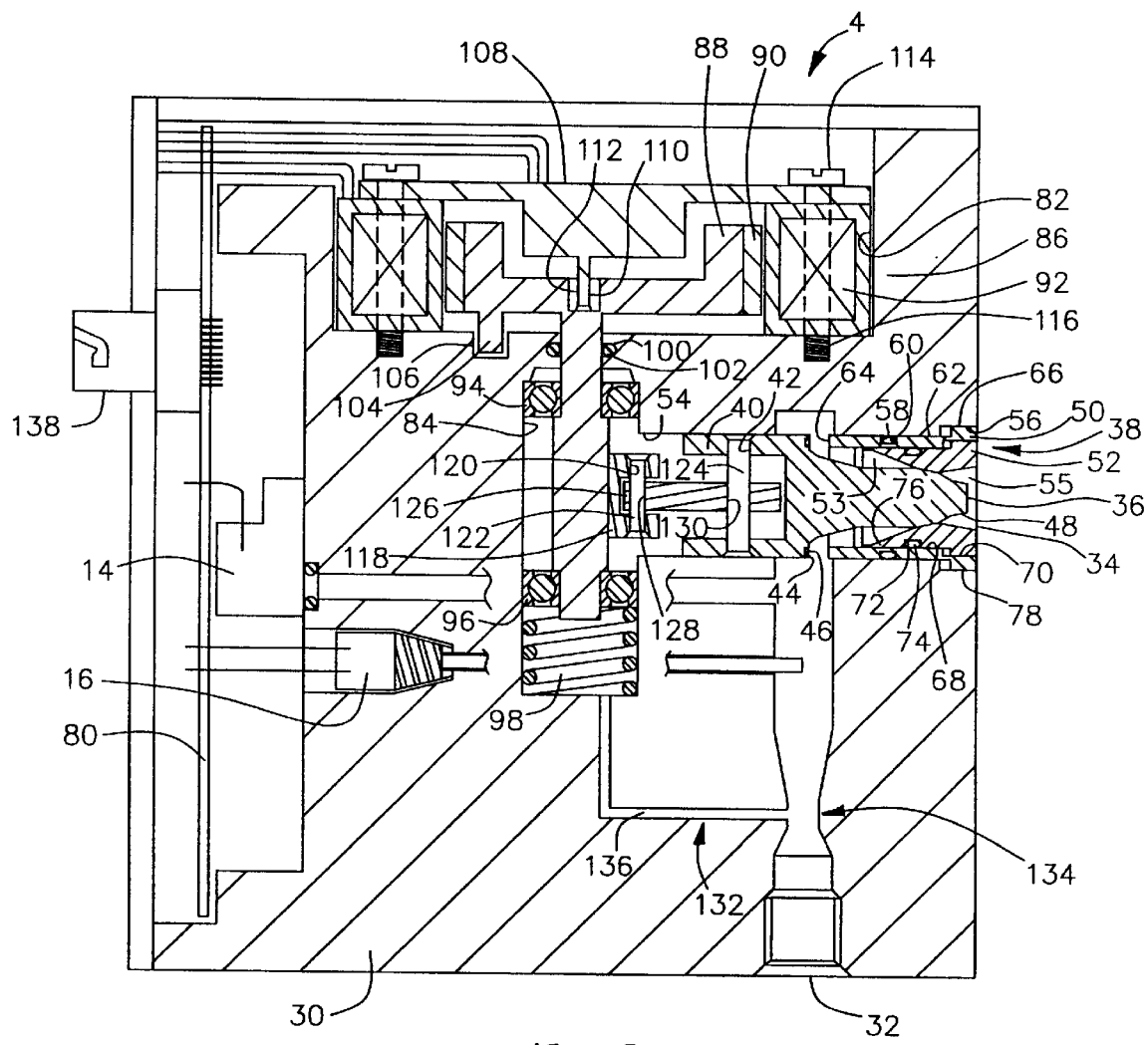
FIG. 2 is a cross-sectional view of a fuel admission valve constructed in accordance with the invention.

In accordance with the invention, the gas fuel admission valve 4 of FIG. 1 is shown in cross-section in FIG. 2. The valve 4 generally comprises a housing 30, defining an inlet port 32 in communication with a gas supply, an outlet port 34 in communication with an engine, and a flow passage between the inlet port 32 and outlet port 34. A flow control element 36 is mounted for coaxial positioning at least partially within a nozzle 38 that is mounted in the flow passage. Flow control element 36 has a body portion 40 having a bore 42 therethrough, a sealing face 44 having a sealing element 46 (made of nitrile or similar acceptable sealing material) embedded therein and a diffuser portion 48. The nozzle has an outer nozzle portion 50 and an inner nozzle portion 52 which provide nozzle 38 with a converging inlet 53 and diffusing outlet 55. The housing 30 has a first bore 54 in which flow control element 36 is slidingly received. Housing 30 has a threaded second bore 56. Outer nozzle portion 50 has an annular groove 58 for receipt of an 0-ring seal 60 about a first outer periphery 62, and has a sealing face 64. Outer nozzle portion 50 is friction-fit and sealed within first housing bore 54 by 0-ring seal 60. Outer nozzle portion 50 is threaded about a second periphery 66 for engagement with threaded housing second bore 56. Threaded housing bore 56 and threaded second periphery 66 provide adjustment of the sealing engagement between the sealing face 44 and sealing element 46 of flow control element 36 and the sealing face 64 of outer nozzle portion 50 to permit the valve 4 to achieve an integral positive shut-off feature.

Outer nozzle portion 50 has a first bore 6 8 and a threaded second bore 70. Inner nozzle portion 52 has an annular groove 72 for receipt of an 0-ring seal 74 about a first outer periphery 76. Inner nozzle portion 52 is friction-fit and sealed within the first bore 68 of outer nozzle portion 50 by 0-ring seal 74. Inner nozzle portion 52 is threaded about a second periphery 78 for engagement with threaded second bore 70 of outer nozzle portion 50. Threaded bore 70 of outer nozzle portion 50 and threaded second periphery 78 of inner nozzle portion 52 provide for flow adjustment of the nozzle 38 relative to the flow control element 36.

As seen in FIGS. 1 and 2, the gas fuel admission valve 4 of the present invention has a gas supply pressure sensor 14 with a sensing element in communication with the inlet port 32 of housing 30 to measure $P_1$. The preferred embodiment is shown with a printed circuit board mounted absolute pressure sensor, although one skilled in the art will appreciate that many other types of pressure sensors could be used. Valve 4 also has a temperature sensor 16, such as of the readily available Thermistor type, with a sensing element positioned so as to be in communication with and measure the temperature of the gas supply in the inlet port 32 of housing 30. The pressure sensor 14 and temperature sensor 16 are wired to a circuit board 80 within valve 4.

Housing 30 has a cavity 82 and a third bore 84 running perpendicular to first bore 54 and second bore 56. Housing cavity 82 houses the limited angle rotary actuator 86. Generally speaking, in the preferred embodiment, the actuator 86 consists of a one-piece rotor and shaft (rotor) 88, a ring-type permanent magnet 90 and coil and stator assembly 92. The rotor 88 rides within upper ball bearing assembly 94 and lower ball bearing assembly 96. The bearing assemblies 94 and 96 are preloaded for vibrational wear control by spring 98, such as with a spring force of 20 times the weight of the rotor assembly.

Housing 30 has an annular groove 100 for receipt of a seal 102, such as a hybrid PTFE/O-ring seal preferably of the Roto-Glide Ring type (Roto-Glide Ring is a tradename of Shamban), to provide a low friction seal between the housing cavities in communication with the housing inlet port 32 and outlet port 34 and the housing cavity 82 that houses the actuator 86. The embodiment shown in FIG. 2, has a travel limiting feature provided by a tab 104 on rotor 88 that moves within a fixed slot 106 in housing 30. The necessary rotational travel of the rotor 88 is dictated by the gas used, the gas supply pressure, the size and contour of the valve components and the flow demands on the system. In the preferred embodiment, using a limited angle rotary actuator 86, rotational travel of the rotor 88 is limited to approximately 65 degrees. This embodiment also includes a position feedback sensor 108 with a feedback shaft 110 that fixedly engages with a slot 112 in rotor 88. Although it will be understood that various types of position sensors could be used, the position sensor 108 in the preferred embodiment is of the conductive plastic potentiometer type and is fixedly mounted to the housing 30 by bolts 114 in threaded holes 116. The position sensor 108 monitors the rotational travel of rotor 88 and reports its signal to the flow control circuit via connection to the circuit board 80.

The shaft portion of rotor 88 has a block 118 mounted to its outer surface by conventional means such as by screw assemblies. The block 118 has a bore 120 therethrough which receives a press-fit pin 122. Bore 42 of flow control element 36 similarly receives a press-fit pin 124. A link 126, at its first end, receives the rotor mounted pin 122 in a close clearance first bore 128, and at its other end, receives the flow control element mounted pin 124 in a close clearance bore 130. Because the rotor mounted pin 122 is offset from the centerline and corresponding axis of rotation of the rotor 88, the pin 122 acts as a crankshaft journal. Accordingly, as the actuator 86 imparts rotational movement to the rotor 88, the link 126 pivots on pins 122 and 124, within bores 128 and 130 respectively, translating the rotational motion of rotor 88 into the linear sliding motion of flow control element 36 in first housing bore 54. The necessary travel of the flow control element 36 is dictated by the gas used, the gas supply pressure, the size and contour of the valve components and the flow demands on the system. The embodiment shown is configured to provide approximately three tenths of an inch of travel of the flow control element 36 for the approximately 65 degree limited rotational movement of the rotor 88.

FIG. 2 also shows a passive condensate removal system 132. The inlet port 32 of housing 30 includes a nozzle portion having a reduced diameter throat 134. The condensate removal system employs small scavenging passageways 136 between the throat 134 and points within the housing 30 that are most likely to collect liquids (i.e., condensation or oil). FIG. 1 shows one such passageway 136. When gas is flowing through the valve 4, the reduced diameter throat 134 creates a venturi effect, drawing any condensate through the passageway 136 to be atomized and sent through the fuel admission system to be consumed in the engine.

The valve 4 of FIG. 2 commnunicates with the engine control unit by virtue of its connection thereto via connector 138 mounted to circuit board 80. The valve 4 provides the engine control unit with the supply pressure and temperature of the gas fuel as measured by the pressure sensor 14 and temperature sensor 16, respectively. One skilled in the art will appreciate that the engine control unit and valve 4 could communicate further information related to fuel admission as well as information necessary or helpful to diagnostic routines.

Figure 3:
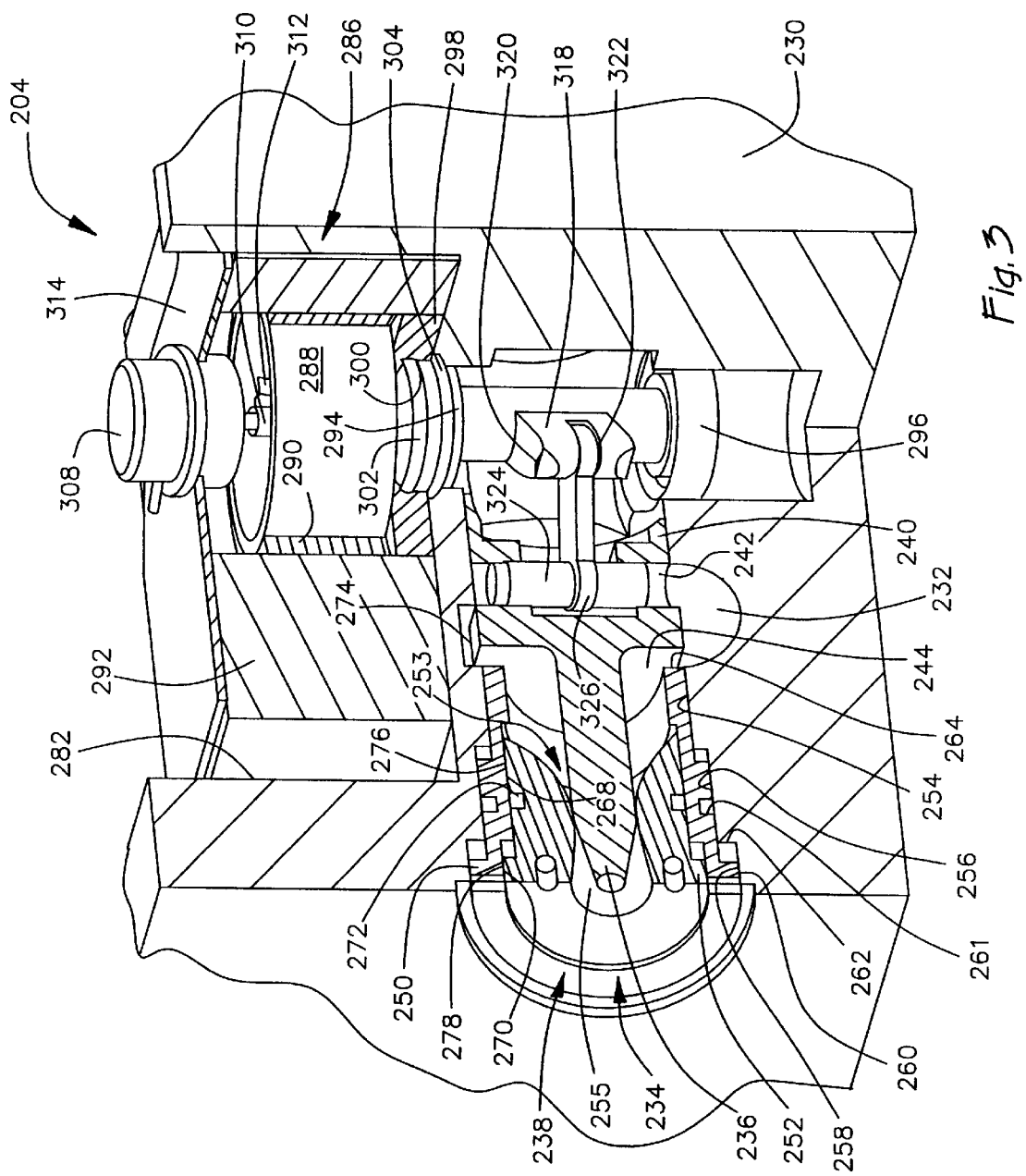
FIG. 3 is a fragmentary perspective view of a fuel admission valve constructed in accordance with the invention.
Figure 4:
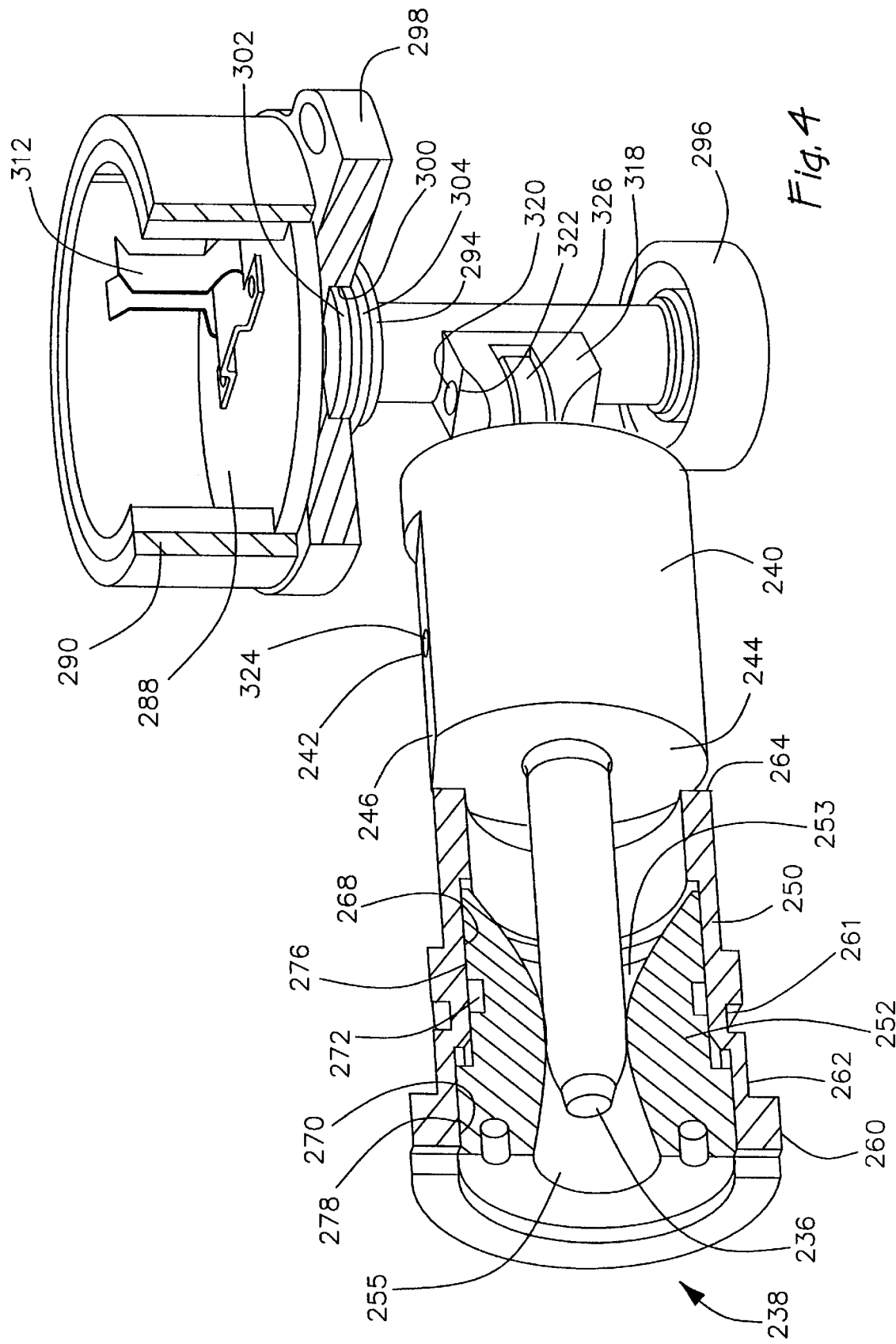
FIG. 4 is a perspective sectional view of the nozzle, flow control element and actuator of FIG. 3.

Now turning to FIGS. 3 and 4, where a slightly different embodiment of the invention is shown in perspective views. A valve 204 generally comprises a housing 230, defining an inlet port 232 in communication with a gas supply, an outlet port 234 in communication with an engine and a flow passage between the inlet port 232 and outlet 234. A flow control element 236 is mounted for coaxial positioning at least partially within a nozzle 238 that is mounted in the flow passage. Flow control element 236 has a body portion 240 having a bore 242 therethrough, and a sealing face 244. The nozzle has an outer nozzle portion 250 and an inner nozzle portion 252 which provide nozzle 238 with a converging inlet 253 and diffusing outlet 255. The housing 230 has a first bore 254 in which flow control element 236 is slidingly received. Housing 230 has a second bore 256, and a threaded third bore 258. Outer nozzle portion 250 is threaded about a first outer periphery 260 for engagement with a threaded portion of housing third bore 258. Outer nozzle portion 250 has an annular groove 261 for receipt of an O-ring seal (not shown) about a second outer periphery 262, and has a sealing face 264. Outer nozzle portion 250 is friction-fit and sealed within second housing bore 256 by the O-ring seal not shown. Partially threaded housing bore 258 and threaded first outer periphery 260 provide adjustment of the sealing engagement between the sealing face 244 of flow control element 236 and the sealing face 264 of outer nozzle portion 250 to permit the valve 204 to achieve an integral positive shut-off feature.

Outer nozzle portion 250 has a first bore 268 and a threaded second bore 270. Inner nozzle portion 252 has an annular groove 272 for receipt of an O-ring seal (not shown) about a first outer periphery 276. Inner nozzle portion 252 is friction-fit and sealed within the first bore 268 of outer nozzle portion 250 by the O-ring seal not shown. Inner nozzle portion 252 is threaded about a second periphery 278 for engagement with threaded second bore 270 of outer nozzle portion 250. Threaded bore 270 of outer nozzle portion 250 and threaded second periphery 278 of inner nozzle portion 252 provide for flow adjustment of the nozzle 238 relative to the flow control element 236.

As seen in FIG. 3, first bore 254 in housing 230 has an annular recess 274. As shown in FIG. 4, flow control element 236 has a machined flat 246 along its body. The annular recess 274 and machined flat 246 provide venting of the flow control element 236 as it slides within bore 254. Although not shown in this embodiment, the valve 204 would have a temperature sensor with a sensing element positioned so as to be in communication with the gas supply in the inlet port 232 of housing 230, and the associated gas pressure sensor.

Housing 230 has a cavity 282 and a third bore 284 running perpendicular to first bore 254 and second bore 258. Housing cavity 282 houses an actuator 286 generally of the type described above in the preferred embodiment. In this embodiment, the actuator 286 consists of a one-piece rotor and shaft (rotor) 288, a ring-type permanent magnet 290 and coil and stator assembly 292. The rotor 288 rides within upper ball bearing assembly 294 and lower ball bearing assembly 296. The bearing assemblies 294 and 296 are preloaded for vibration and wear control by a spring (not shown) below the lower bearing assembly 296.

Housing 230 receives a plate 298 within the cavity 282. Plate 298 has an bore 300 for receipt of a low friction seal 302, of the preferred type previously mentioned, to provide a seal between the housing cavities in communication with the housing inlet port 232 and outlet port 236 and the housing cavity 282 that houses the actuator 286. In the embodiment shown in FIGS. 3 and 4, the upper bearing assembly 294 is surrounded by an O-ring 304 to enhance the seal reliability of the seal 302. This embodiment also includes a position feedback sensor 308 with a feedback shaft 310 that fixedly engages with a clip 312 in rotor 288. The position sensor 308 is fixedly mounted to the housing 230 on top of mounting plate 314. The position sensor 308 monitors the rotational travel of rotor 288 and reports its signal to the flow control circuit.

The shaft portion of rotor 288 has a block 318 mounted to its outer surface by conventional means such as by screw assemblies. The block 318 has a bore 320 therethrough which receives a press-fit pin 322. Bore 242 of flow control element 236 similarly receives a press-fit pin 324. A link 326, at its first end, receives the rotor mounted pin 322 in the first end, and at its other end, receives the flow control element mounted pin 324. Because the rotor mounted pin 322 is offset from the centerline and corresponding axis of rotation of the rotor 288, the pin 322 acts as a crankshaft journal. Accordingly, as the actuator 286 imparts rotational movement to the rotor 288, the link 326 pivots at its ends on pins 322 and 324, translating the rotational motion of rotor 288 into the linear sliding motion of flow control element 236 in first housing bore 254. As with the first preferred embodiment, this embodiment is configured to provide approximately three tenths of an inch of travel of the flow control element 236 for the approximately 65 degree limited rotational movement of the rotor 288.

Although not shown, it is contemplated that this embodiment would employ a condensate removal system and pressure and temperature sensors similar to those shown in FIG. 2.

FIGS. 5A–5E illustrate a series of positions within the travel of another embodiment of a flow control element, orifice and actuation means. FIG. 5A depicts a housing portion 400 having an inlet 402 in communication with a gas supply, an outlet 404 in communication with an engine and a flow passage between the inlet 402 and outlet 404. As in the foregoing embodiments, a flow control element 406 is mounted for controllable positioning at least partially within a nozzle 408 mounted in the flow passage.

Flow control element 406 has a body portion 410 having a first bore 412 and a smaller second bore 414, a sealing face 416 having a sealing element 418 embedded therein and a diffusing portion 420. The nozzle 408 is of one-piece construction having a converging inlet 422 and diffusing outlet 424. The housing 400 has a first bore 426 which receives a press-fit pin 428 for sliding engagement with first bore 412 of flow control element 406. The housing 400 has a second bore 430 and a threaded third bore 432. Nozzle portion 408 has an annular groove 434 for receipt of an O-ring seal (not shown) about a first outer periphery 436, and has a sealing face 438. Nozzle portion 408 is friction-fit and sealed within second housing bore 430 by the O-ring seal not shown. Nozzle portion 408 is threaded about a second periphery 440 for engagement with threaded housing third bore 432. Threaded housing bore 432 and threaded second periphery 440 provide adjustment of the sealing engagement between the sealing face 416 and sealing element 418 of flow control element 408 and the sealing face 438 of nozzle portion 408 to permit the valve to achieve an integral positive shut-off feature.

Disposed within housing 400 is a rotary actuated crank mechanism 442 which rotates about its center. In this embodiment, crank mechanism 442 has a limited angular travel of approximately 65 degrees. Crank mechanism 442 receives a press-fit pin 444. Flow control element 406 receives a similar press-fit pin 446. A link 448, at its first end, receives the crank mounted pin 444 in a first bore 450, and at its other end, receives the flow control element mounted pin 446 in a bore 452. Because the crank mounted pin 444 is offset from the centerline and corresponding axis of rotation of the rotary actuator crank mechanism 442, the pin 444 acts as a crankshaft journal. Accordingly, as the rotary actuator crank mechanism 442 imparts rotational movement, the link 448 pivots on pins 444 and 446, within bores 450 and 452 respectively, translating the rotational motion of crank mechanism 442 into the linear sliding motion of flow control element 406 on housing mounted pin 428. To permit unimpeded movement relative to housing mounted pin 428, flow control element 406 is vented through the smaller bore 414. This embodiment also is configured to provide approximately three tenths of an inch of travel of the flow control element 406 for the approximately 65 degrees of rotational movement of the crank mechanism 442.

FIG. 5A shows the flow control element 406 in a fully closed position, with a positive seal against nozzle 408. The flow control element 406 is naturally biased to the closed position by the pressure imbalance due to the gas pressure $P_1$ in the inlet 402 of housing 400. The crank mechanism is at 0 degrees of travel, and the gas pressure biasing of the flow control element 406 adds to the substantial sealing force that can be generated based on the leverage of the link 448 and rotary actuator crank mechanism 442 in the range of initial angular travel.

FIG. 5B shows the embodiment of FIG. 5A with the crank mechanism at 7 degrees of travel, and the flow control element 406 at 0.0042 inches of travel. This corresponds approximately to the point at which the sealing element 418 disengages from the sealing face 438 of nozzle 408. At this point of travel, the crank 442 and link 448 are still capable of providing substantial force to move flow control element 406 to overcome the pressure imbalance force. Also, the rate of opening at the interface between the sealing element 418 on flow control element 406 and the sealing face 438 of nozzle 408 begins to greatly exceed the rate of opening at the area of minimum clearance within nozzle 408 between the flow control element 406 and the nozzle 408.

FIG. 5C shows the embodiment of FIG. 5A with the crank mechanism at approximately 110 degrees of travel, and the flow control element 406 at 0.0085 inches of travel. This corresponds approximately to a point of minimum gas delivery of 1.3 pounds per hour (PPH). The region between the sealing element 418 and sealing face 438 of nozzle 408 is substantially more open than the area of minimum clearance within nozzle 408 between the flow control element 406 and the nozzle 408. Thus allowing essentially unrestricted flow upstream of the point of metering.

FIG. 5D shows the embodiment of FIG. 5A with the crank mechanism at approximately 37.5 degrees or 50% of angular travel of rotary actuator crank mechanism 442, and the flow control element 406 at 0.113 inches of travel. This corresponds approximately to a point of gas delivery of 26.1 PPH. The crank mechanism 442 is achieving substantially greater linear travel of the flow control element 406 per degree of rotation relative to the conditions depicted in FIGS. 5B and 5C.

FIG. 5E shows the embodiment of FIG. 5A with the crank mechanism at approximately 65 degrees or 100% of angular travel of rotary actuator crank mechanism 442, and the flow control element 406 at 0.328 inches of travel. This corresponds to a point of maximum gas delivery of 143 PPH. In the region of travel near the maximum fuel delivery point, the crank mechanism 442 achieves rapid linear movement of flow control element 406 but with reduced leverage or force.

Turning now to FIGS. 6A–6C, still another embodiment of a flow control element, orifice and actuation means is shown in the positions of being closed, 50% open, and 100% open. FIG. 6A depicts a gas fuel admission valve 500 in a closed position having nozzle 501 having a converging inlet 502 in communication with a gas supply, and a diffusing outlet 504 in communication with an engine. A flow control element 506 is shown with a body portion 508 and a converging portion 510. In this embodiment, flow control element 506 approaches nozzle 500 from the diffusing outlet 504 side of nozzle 501. Flow control element 506 has a rack portion 512 having teeth 514, for engagement with a pinion gear 516 mounted on a rotary actuator shaft 518. As with the above described embodiments, this embodiment uses a limited angle rotary actuator, but other types of rotary actuators could be used. Also, one of skill in the art will appreciate that a linear actuator could be used as discussed above.

FIG. 6B shows the fuel admission valve 500 of FIG. 6A with the flow control element in a position of 50% lift or half open. FIG. 6C shows the gas admission valve 500 of FIG. 6A with the flow control element in a position of 100% lift or fully open.

In terms of the sonic flow principles and insensitivity to discharge pressure, the embodiment of FIGS. 6A–6C operates in much the same manner as the previously described embodiments. However, the more direct relationship between angular travel of rotary actuator shaft 518 and linear travel of flow control element 506 results in no greater mechanical advantage in the region of low flow than in the region of high flow. More importantly, the inevitable and frequent, albeit minor error generated in chasing the moving target of the desired flow signal supplied by an engine control unit will have the same absolute value regardless of whether the valve is in a region of low flow or high flow. This is problematic in that the same absolute error is an error of much greater percentage in a low flow condition than in a high flow condition.

Figure 7:
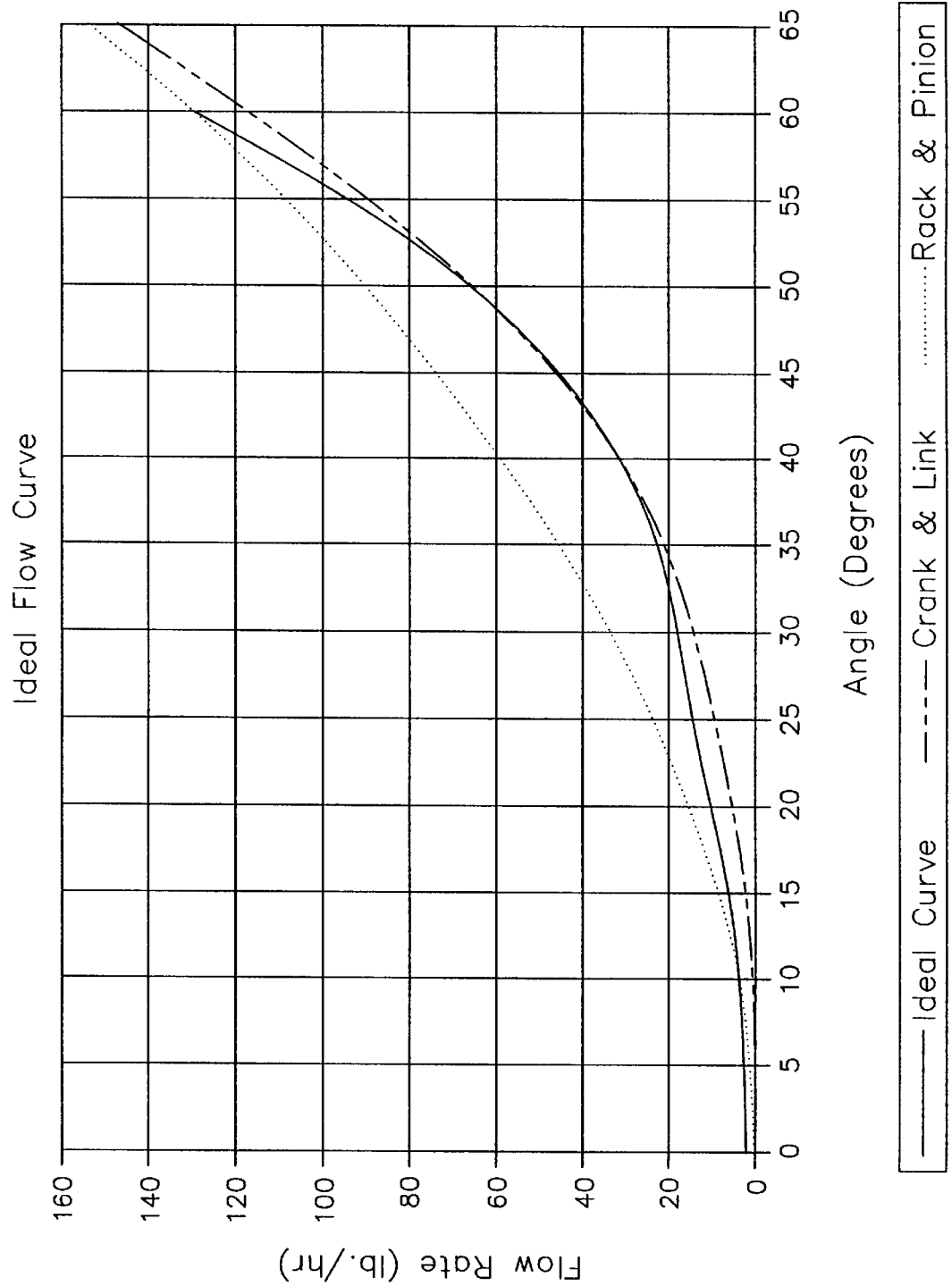
FIG. 7 is a graph of the flow rate versus angular rotation for an ideal valve, a valve constructed in accordance with the invention using a crank and link actuator, and a valve constructed in accordance with the invention using rack and pinion actuation.

FIG. 7 shows the relationship between an ideal flow curve and the flow curves for a crank and link actuator mechanism which produces an $e^x$ function and a rack and pinion actuator mechanism which generates a more linear flow curve. The $e^x$ type flow curve attainable with a crank and link actuator mechanism permits the valve to maintain throughout operation of the engine a substantially constant limit of maximum percent error between the desired fuel mass flow and the actual mass flow provided.

What is claimed is:

1. A gas fuel admission system for use with a gas supply and an internal combustion engine having an engine control unit that produces a desired mass flow signal for present engine operating conditions, said fuel admission system comprising:

a gas fuel admission valve having a needle and a converging-diverging type nozzle for metering gas from the gas supply to the engine, said nozzle having a converging inlet and diffusing outlet;

an actuator for moving said needle relative to said nozzle;

a gas supply pressure sensor for producing a signal related to gas supply pressure;

a gas supply temperature sensor for producing a signal related to gas supply temperature;

a position sensor for producing a signal related to the position of said needle; and a flow control circuit responsive to said desired mass flow signal from said engine control unit, said supply pressure signal, said supply temperature signal, and said needle position signal to determine the appropriate needle position needed to achieve the desired mass flow at the present engine operating conditions.

2. The system in accordance with claim 1 wherein said system is capable of operating with gas flow through said gas admission valve that is always sonic.

3. The system in accordance with claim 1 wherein said flow control circuit further comprises a microprocessor.

4. The system in accordance with claim 1 wherein said system further comprises communication means to provide information to said engine control unit.

5. The system in accordance with claim 1 wherein said system further comprises an integral gas shutoff.

6. The system in accordance with claim 1 wherein said system further comprises a closed loop position control system to enhance the precision and response of said actuator.

7. The system in accordance with claim 1 wherein said desired mass flow signal received from said engine control unit is a pulse width modulated signal.

8. The system in accordance with claim 1 wherein said system maintains throughout operation of said engine a substantially constant limit of maximum percent flow error between the desired gas mass flow and the actual gas mass flow provided.

9. The system in accordance with claim 1 wherein said needle is contoured to promote diffusion.

10. The system in accordance with claim 9 wherein said gas passing through said valve has a discharge pressure and wherein said gas passing through said valve is capable of maintaining sonic flow for discharge pressure to supply pressure ratios substantially above the critical pressure ratio for said gas being flowed.

11. The system in accordance with claim 1 wherein said flow control circuit produces a signal related to said determined appropriate needle position necessary to achieve the desired mass flow at said present operating conditions.

12. The system in accordance with claim 1 wherein said actuator is responsive to said flow control circuit signal.

13. The system in accordance with claim 1 wherein said flow control circuit further comprises means for determining gas supply pressure correction factors and gas supply temperature correction factors and means for determining the characteristic needle position versus mass flow at standard operating conditions.

14. The system in accordance with claim 13 wherein said flow control circuit applies said gas supply pressure and temperature correction factors and said needle position versus mass flow characteristic to determine the appropriate needle position needed to achieve the desired mass flow at the present operating conditions.

15. A gas fuel admission system, said system comprising:

a gas fuel admission valve having a flow control element and a converging-diverging type orifice for metering gas between a gas supply and an internal combustion engine, said orifice having a converging inlet and a diffusing outlet;

an engine control unit that produces a desired gas mass flow signal for the operating conditions of said internal combustion engine;

an actuator for moving said flow control element to control said mass flow of said gas to said engine;

a gas supply pressure sensor for producing a signal related to gas supply pressure;

a gas supply temperature sensor for producing a signal related to gas supply temperature;

a position sensor for producing a signal related to the position of said flow control element; and a flow control circuit responsive to said desired mass flow signal from said engine control unit, said gas supply pressure signal, said gas temperature signal, and said flow control element position signal to determine the appropriate flow control element position needed to achieve the desired mass flow at the present engine operating conditions.

16. The system in accordance with claim 15 wherein said flow control circuit further comprises a microprocessor.

17. The system in accordance with claim 15 wherein said system further comprises communication means to provide information to said engine control unit.

18. The system in accordance with claim 15 wherein said system further comprises an integral gas shutoff.

19. The system in accordance with claim 15 wherein said flow control element is contoured to promote diffusion.

20. The system in accordance with claim 19 wherein said gas passing through said valve has a discharge pressure and wherein said gas flow through said valve is capable of maintaining sonic flow for discharge pressure to supply pressure ratios substantially above the critical pressure ratio for said gas being flowed.

\* \* \* \* \*